United States Patent
Wang et al.

(10) Patent No.: US 11,276,238 B2
(45) Date of Patent: Mar. 15, 2022

(54) METHOD, APPARATUS AND ELECTRONIC DEVICE FOR GENERATING A THREE-DIMENSIONAL EFFECT BASED ON A FACE

(71) Applicant: BEIJING MICROLIVE VISION TECHNOLOGY CO., LTD, Beijing (CN)

(72) Inventors: Jing Wang, Beijing (CN); Xin Lin, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/967,962

(22) PCT Filed: Dec. 25, 2018

(86) PCT No.: PCT/CN2018/123641
§ 371 (c)(1),
(2) Date: Aug. 6, 2020

(87) PCT Pub. No.: WO2020/019665
PCT Pub. Date: Jan. 30, 2020

(65) Prior Publication Data
US 2021/0035369 A1    Feb. 4, 2021

(30) Foreign Application Priority Data
Jul. 27, 2018    (CN) .......................... 201810838414.X (51) Int. Cl.
*G06T 19/00* (2011.01)
*G06T 15/04* (2011.01)
(Continued)

(52) U.S. Cl.
CPC ........ *G06T 19/006* (2013.01); *G06K 9/00281* (2013.01); *G06T 7/74* (2017.01); *G06T 15/04* (2013.01); *G06T 2207/30201* (2013.01)

(58) Field of Classification Search
CPC ......... G06T 19/006; G06T 7/74; G06T 15/04; G06T 2207/30201; G06T 2219/2012;
(Continued)

(56) References Cited

U.S. PATENT DOCUMENTS

| 7,324,117 B1 * | 1/2008 | Donovan | ................ G06T 15/04 345/428 |
| 2004/0150641 A1 * | 8/2004 | Duiker | .................... G06T 15/20 345/426 |

(Continued)

FOREIGN PATENT DOCUMENTS

| CN | 101452582 A | 6/2009 |
| CN | 102800130 A | 11/2012 |

(Continued)

OTHER PUBLICATIONS

Mengmeng Han, "The Design and Realization of Generating the Special Image Overlay Effects in Facial Video"; Qilu University of Technology; Thesis; Jun. 2017; 71 pages (English Abstract pp. 4 and 8).

(Continued)

*Primary Examiner* — Tapas Mazumder
(74) *Attorney, Agent, or Firm* — BakerHostetler (57) ABSTRACT

Disclosed is a method, an apparatus, an electronic device and a computer readable storage medium for generating a three-dimensional effect based on a face. In an embodiment of the method, a standard face image is displayed, a three-dimensional effect which located on the standard face image is created at least by configuring a three-dimensional model and configuring a material of the three-dimensional model, (Continued)

effect parameters are generated according to the three-dimensional effect, a first face image recognized from an image sensor is obtained, and the three-dimensional effect is generated on the first face image according to the effect parameters. Through the above method, the three-dimensional effect can be easily configured and edited, and the three-dimensional effect generation algorithm can generate three-dimensional effects on the face images acquired in real time using three-dimensional effects parameters.

18 Claims, 7 Drawing Sheets

(51) Int. Cl.
*G06T 7/73* (2017.01)
*G06K 9/00* (2022.01)

(58) Field of Classification Search
CPC ....... G06T 19/20; G06T 5/005; G06T 15/005; G06T 2207/10012; G06K 9/00281; G06K 9/00201; G06K 9/00228; G06K 9/2027
See application file for complete search history.

(56) References Cited

U.S. PATENT DOCUMENTS

| 2008/0170067 A1* | 7/2008 | Kim | G06T 7/50 345/419 |
| 2015/0085073 A1* | 3/2015 | Bruls | H04N 13/128 348/43 |
| 2015/0348285 A1* | 12/2015 | Wang | G06T 15/04 345/582 |
| 2016/0178936 A1* | 6/2016 | Yang | G06T 11/60 351/246 |

FOREIGN PATENT DOCUMENTS

| CN | 105354872 A | 2/2016 |
| CN | 106341720 A | 1/2017 |
| CN | 108062791 A | 5/2018 |
| CN | 108073669 A | 5/2018 |

OTHER PUBLICATIONS

International Patent Application No. PCT/CN2018/123641; Int'l Search Report; dated Apr. 28, 2019; 2 pages.

* cited by examiner

METHOD, APPARATUS AND ELECTRONIC DEVICE FOR GENERATING A THREE-DIMENSIONAL EFFECT BASED ON A FACE

CROSS REFERENCE

The disclosure is the national phase application of International Patent Application No. PCT/CN2018/123641, titled "METHOD, APPARATUS AND ELECTRONIC DEVICE FOR GENERATING A THREE-DIMENSIONAL EFFECT BASED ON A FACE", filed on Dec. 25, 2018, which refers to a Chinese patent application No. 201810838414.X, filed on Jul. 27, 2018, entitled "METHOD, APPARATUS AND ELECTRONIC DEVICE FOR GENERATING A THREE-DIMENSIONAL EFFECT BASED ON A FACE", both of which are hereby incorporated by reference in their entireties.

FIELD OF THE APPLICATION

The disclosure relates to the technical field of image, and more particularly, to a method, an apparatus, an electronic device and a computer readable storage medium for generating a three-dimensional effect based on a face.

BACKGROUND OF THE APPLICATION

With the development of computer technology, the application range of smart terminals has been widely expanded, for example, listening to music, playing games, chatting on the Internet, and taking pictures through smart terminals. For the photographing technology of the smart terminal, the pixel has reached more than 10 million, and has high definition with the effects comparable to the professional camera.

At present, when using a smart terminal to take a picture or take a video, not only can the built-in photographing software at the factory be used to realize the photographing and video effects of traditional functions, but also can the application (referred to as: APP) be downloaded from the network to realize the photographing effect or video effect with additional functions.

The current APPs for special effects production are pre-made with some effects, which cannot be edited flexibly, and the effects can only be fixed at a fixed position of the image.

SUMMARY OF THE APPLICATION

According to an aspect of the disclosure, the disclosure provides a method for generating a three-dimensional effect based on a face comprising steps of: displaying a standard face image; creating a three-dimensional effect at least by configuring a three-dimensional model and configuring a material of the three-dimensional model, the three-dimensional effect being located on the standard face image; generating effect parameters according to the three-dimensional effect; obtaining a first face image recognized from an image sensor; generating the three-dimensional effect on the first face image according to the effect parameters.

Optionally, the configuring the three-dimensional model comprises: obtaining the three-dimensional model, and displaying it on the standard face image; configuring a position and a size of the three-dimensional model.

Optionally, the configuring a material of the three-dimensional model comprises: creating the material, and adjusting a parameter of the material; the parameter of the material comprises a parameter for rendering and blending, a parameter for whether to perform depth testing, a parameter for whether to perform depth writing, and a parameter for whether to perform eliminating one or more of parameters.

Optionally, the creating a three-dimensional effect further comprises: configuring a light source, the light source comprising one of a point light source, a parallel light source, and a spotlight source.

Optionally, the configuring a light source comprises: configuring a position, an orientation, a color, and an intensity of the light source.

Optionally, the creating a three-dimensional effect further comprises: configuring a map of the three-dimensional model comprising: obtaining a texture of the map; configuring a wrapping mode of the texture.

Optionally, the standard face image comprises face landmarks, and after the displaying the standard face image, the method comprises: receiving an instruction to select reference points, selecting at least one landmark as reference points; generating the three-dimensional effect on the first face image according to the effect parameters comprising: generating the three-dimensional effect on the first face image according to the effect parameters and the reference point.

According to another aspect of the disclosure, the disclosure provides an apparatus for generating a three-dimensional effect based on a face comprising: a display module, configured to display a standard face image; a three-dimensional effect creating module, configured to create a three-dimensional effect at least by configuring a three-dimensional model and configuring a material of the three-dimensional model on the standard face image; an effect parameter generation module, configured to generate effect parameters according to the three-dimensional effect; a face image obtaining module, configured to obtain a first face image recognized from an image sensor; a three-dimensional effect generation module, configured to generate the three-dimensional effect on the first face image according to the effect parameters.

Optionally, the configuring a material of the three-dimensional model comprises: obtaining the three-dimensional model, and displaying it on the standard face image; configuring a position and a size of the three-dimensional model.

Optionally, the configuring a material of the three-dimensional model comprises: creating the material, and adjusting a parameter of the material; the parameter of the material comprises a parameter for rendering and blending, whether to perform depth testing, whether to perform depth writing, and whether to perform eliminating one or more of parameters.

Optionally, the three-dimensional effect creating module is further used for configuring a light source, the light source comprising one of a point light source, a parallel light source, and a spotlight source.

Optionally, the configuring a light source comprises: configuring a position, an orientation, a color, and an intensity of the light source.

Optionally, the three-dimensional effect creating module is further used for configuring a map of the three-dimensional model comprising: obtaining a texture of the map; configuring a wrapping mode of the texture.

Optionally, the standard face image comprises face landmarks, and the apparatus for generating a three-dimensional effect based on a face further comprises: a reference point selection module for receiving an instruction to select reference points, selecting at least one landmark as reference points; the three-dimensional effect generation module for generating the three-dimensional effect on the first face image according to the effect parameters and the reference points.

According to still another aspect of the disclosure, the disclosure provides an electronic device comprising: a memory for storing a non-transitory computer readable instruction; and a processor for executing the computer readable instruction such that the processor, when executed, implements the steps of any one of the methods described above.

According to still another aspect of the disclosure, the disclosure provides a computer readable storage medium for storing a non-transitory computer readable instruction; when the non-transitory computer readable instructions are executed by a computer, the computer is enabled to execute the steps of any one of the methods described above.

Provided is a method and apparatus for generating a three-dimensional effect based on a face, an electronic device and a computer readable storage medium in the embodiment. The method comprises steps of: displaying a standard face image; creating a three-dimensional effect at least by configuring a three-dimensional model and configuring a material of the three-dimensional model, the three-dimensional effect being located on the standard face image; generating effect parameters according to the three-dimensional effect; obtaining a first face image recognized from an image sensor; generating the three-dimensional effect on the first face image according to the effect parameters. In the embodiment, through the three-dimensional effect creating operation, the three-dimensional effect may be easily configured and edited by a user, and the three-dimensional effect generation algorithm may generate three-dimensional effects on the face images acquired in real time using three-dimensional effects parameters. Therefore, compared with the prior art, the difficulty in editing and the time for editing of the three-dimensional effect are greatly reduced, and the three-dimensional effects may be synchronized with any face images captured in real time, thereby improving the user experience The above description is only an overview of the technical solutions of the disclosure. In order to more clearly understand the technical means of the disclosure, which can be implemented in accordance with the contents of the specification, and to make the above and other objects, features and advantages of the disclosure become more apparent and obvious. Hereinafter, preferred embodiments will be described in detail with reference to the accompanying drawings.

DETAILED DESCRIPTION OF THE PREFERRED EMBODIMENTS

Through specific examples of the disclosure below, technicians of the field can easily understand other advantages and efficacies of the disclosure revealed by the specification. Obviously, the described embodiments are only a part of the embodiments of the disclosure, but not the whole. The disclosure can also be implemented or applied through other different ways, and the details of the specification can also be modified or changed based on different views and applications without deviating from the spirit of the disclosure. It should be noted that, in the case of no conflicts, the following embodiments and features in the embodiments can be combined mutually. Based on the embodiments of the present disclosure, all the other embodiments obtained by those of ordinary skill in the art without inventive effort are within the scope of the present disclosure.

It is to be noted that various aspects of the embodiments within the scope of the appended claims are described below. It should be apparent that the aspects described herein may be embodied in a wide variety of forms, and any specific structure and/or function described herein is merely illustrative. Based on the disclosure, those skilled in the art will appreciate that one aspect described herein can be implemented independently of any other aspects and that two or more of these aspects can be combined in various ways. For example, the device and/or method can be implemented and/or practiced using any number of the aspects set forth herein. In addition, the device and/or the method may be implemented and/or practiced using other structures and/or functionalities than one or more of the aspects set forth herein.

It should be noted that, the diagrams provided in the following embodiments only illustrate the basic conceptions of the disclosure in a schematic way, thus only components relative to the disclosure are shown instead of drawing the number of components, shape and size in actual implementation, in which the type, number and proportion of components can be a kind of random change, and its component, layout type of the components may also be more complex.

In addition, in the following description, specific details are provided to facilitate a thorough understanding of the examples. However, those skilled in the art will appreciate that the aspects can be practiced without these specific details.

Figure 1:
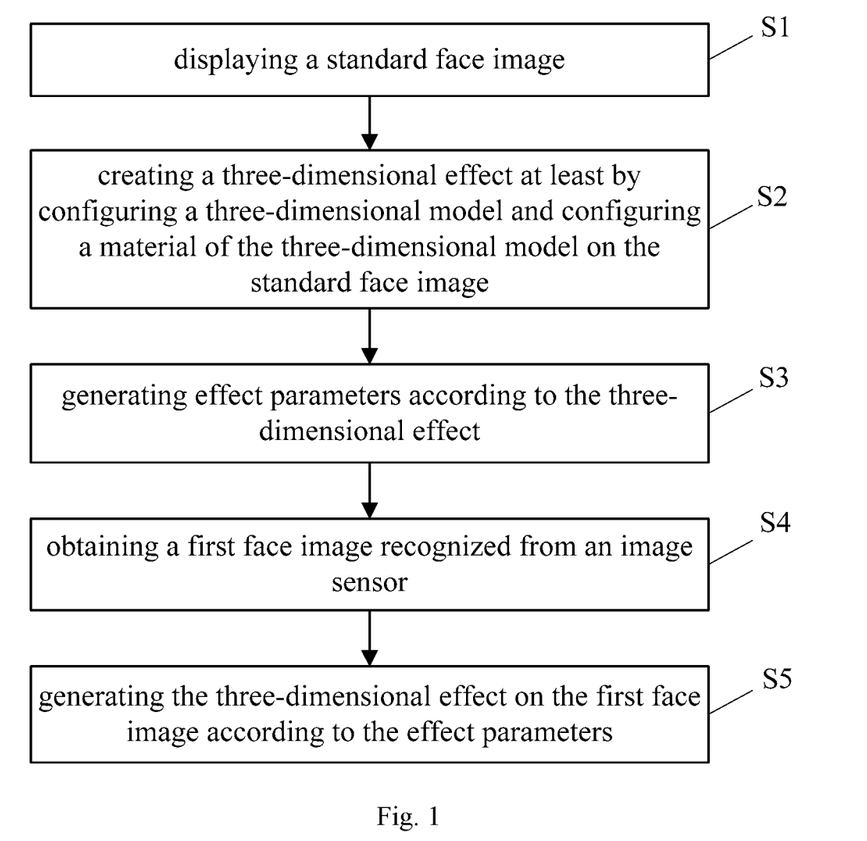
FIG. 1 is a flow chart of a method for generating a three-dimensional effect based on a face according to an embodiment of the disclosure.

In order to solve the technical problem of how to improve the user experience, the embodiment of the disclosure provides a method for generating a three-dimensional effect based on a face. As shown in FIG. 1, the method for generating a three-dimensional effect based on a face mainly comprises the following steps S1 to S5. Among which:

Step S1: displaying a standard face image.

Displaying a standard face image on a display device, the standard face image is a preset face image, and in general, the standard face image is a front face image. The standard face image may be provided with preset landmarks, wherein the number of landmark may be set, and the user may freely set the number of landmark required. The landmark of an image refers to a point in the image that has distinctive characteristics and may effectively reflect the essential characteristics of the image while identifying the target object in the image. If the target object is a human face, then a key point of the face is required to be acquired. If the target image is a house, then a key point of the house is required to be acquired. Taking a face as an example to illustrate the method of obtaining key points, a face contour mainly includes 5 parts of eyebrows, eyes, nose, mouth and cheeks, and sometimes includes pupils and nostrils. In general, in order to achieve a more complete description of the face contour, the number of key points required is about 60. If only the basic structure is described, the details of each part has not to be described in detail, or the cheeks has not to be described, and the number of key points may be reduced accordingly. If the description of the pupil, nostrils, or features that require more detail is required, the number of key points may be increased. The extraction for key points of the face on the image is equivalent to finding the corresponding position coordinates of key points of each face contour in the face image, that is, key point positioning. This process has to be performed based on the characteristics of the key points, wherein after an image feature capable of clearly identifying the key points is obtained, search and comparison are performed in the image according to the features for accurately positioning the position of the key points on the image. Since the landmark occupies only a very small area in the image (usually only a few to tens of pixels), the area of the feature corresponding to the landmark on the image is usually very limited and local, and there are two ways to extract features currently used: (1) image feature extraction along a one-dimensional range in the vertical direction of the contour; (2) image feature extraction from the two-dimensional range of the square neighborhood of the landmark. There are many implementation methods for the above two ways, such as ASM and AAM, statistical energy function, regression analysis, deep learning, using a classifier, batch extraction, and the like. The number of the key points, accuracy, and speed used in the above various implementation methods are different, and are applicable to different application scenarios.

Step S2: creating a three-dimensional effect at least by configuring a three-dimensional model and configuring a material of the three-dimensional model on the standard face image.

In the present embodiment, a three-dimensional effect required is created, and in a typical application, the three-dimensional effect is a three-dimensional sticker. When the three-dimensional effect is created, a three-dimensional model made with third party software may be imported, which does not carry any color information, depth information, material information, texture information, etc. After the three-dimensional model is imported, a parameter configuration may be performed for the three-dimensional model, such as configuring a position of the three-dimensional model on the screen or a position of the three-dimensional model on the standard face image, configuring a size that may be set by a drag box of the three-dimensional model or by directly inputting the length, width and height of the drag box, and a rotation angle of the three-dimensional model including rotation angles on the x-axis, the y-axis, and the z-axis that may be set by dragging the drag box or directly inputting an angle.

After the three-dimensional model is imported, a material of the three-dimensional model may be further configured. When the material is configured, first the material is required to be created, and then a parameter of the material is adjusted. The parameter of the material comprises a rendering and blending mode, whether to perform depth testing, whether to perform depth writing, and whether to perform eliminating one or more of parameters. The parameter of the material further comprises a reflectivity of the body surface to the RGB component of the color light incident on the surface, specifically comprising a degree of reflection for different light, different color components of ambient light, diffuse light, specular light, and self-illumination.

Specifically, the rendering and blending refers to blending two colors together, specifically in the disclosure, referring to blending the color of a pixel location with the color that will be drawn for achieving a special effect. The rendering and blending mode refers to a method for blending. In general, the blending method is to calculate the source color and the target color to obtain a mixed color. In practical applications, the result obtained by multiplying the source color by a source factor and the result obtained by multiplying the target color by a target factor are often calculated to obtain the mixed color. For example, the calculation is an addition, thenBLENDcolor=

SRC_color*SCR_factor+DST_color*DST_factor, wherein 0≤SCR_factor≤1, 0≤DST_factor≤1. According to the above formula, it is assumed that the four components of the source color (referred to as red, green, blue, and alpha values) are (Rs, Gs, Bs, As), and the four components of the target color are (Rd, Gd, Bd, Ad), and it is further assumed that the source factors are (Sr, Sg, Sb, Sa) and the target factors are (Dr, Dg, Db, Da). The new color generated by blending may be represents as (Rs*Sr+Rd*Dr, Gs*Sg+Gd*Dg, Bs*Sb+Bd*Db, As*Sa+Ad*Da), wherein the alpha value represents transparency, and 0≤alpha≤1. The above blending method is only an example. In practical applications, the blending mode may be defined or selected by oneself. The calculation may be addition, subtraction, multiplication, division, taking the larger of the two, taking the smaller of the two, logical operations (and, or, XOR, etc.). The above blending method is only an example. In practical applications, the blending mode may be defined or selected by oneself. The calculation may be addition, subtraction, multiplication, division, taking the larger of the two, taking the smaller of the two, logical operations (and, or, XOR, etc.).

The depth testing refers to setting a depth buffer zone storing a depth information of a pixel corresponding to a color buffer zone storing a color information of a pixel. When deciding whether to draw the surface of an object, first, a depth value of the corresponding pixel on the surface is compared with a value stored in the depth buffer zone, then the part is discarded if the depth value is larger than or equal to the value in the depth buffer zone, and otherwise the depth value and the color value corresponding to this pixel are used to update the depth buffer zone and the color buffer zone respectively. This process is referred to as Depth Testing. When a scene is drawn, the depth buffer zone is cleared when the color buffer zone is cleared; the value of the depth buffer zone is set to 1 when the depth buffer zone is cleared, indicating a maximum depth value, the depth value having a range of [0, 1], wherein a smaller value means closer to the observer, and a larger value means farther away from the observer. When the depth testing is performed, a comparison function may be further set for the depth testing, and there are some typical functions as follows: DF_ALWAYS, which means always passing the test, so that the results obtained here are same as those when the depth testing is not performed, and the depth buffer zone and color buffer zone are always updated with the depth and color values of the current pixel; DF_NEVER, which means never passing the test, so that the values of the depth buffer zone and the color buffer zone are remained still, that is, any pixel points may not be drawn on the screen; DF_LESS, which means passing the test when the current depth value is smaller than the stored depth value; DF_EQUAL, which means passing the test when the current depth value is equal to the stored depth value; DF_LEQUAL, which means passing the test when the current depth value is smaller than or equal to the stored depth value;

DF_GREATER, which means passing the test when the current depth value is larger than the stored depth value; DF_NOTEQUAL, which means passing the test when the current depth value is not equal to the stored depth value; DF_GEQUAL, which means passing the test when the current depth value is larger than or equal to the stored depth value. The depth writing is associated with the depth testing, and in general, if the depth testing is performed and the result of the depth testing is likely to update the value of the depth buffer zone, the depth writing is required to be performed to update the value of the depth buffer zone. The following examples illustrate the process of performing the depth testing and the image drawing process during deep writing. Supposing two color blocks, red and yellow, respectively, are required to be drawn, in the rendering queue, the red block is in front, the yellow block is in the back, the depth value of the red block is 0.5, the depth value of the yellow block is 0.2, and the comparison function used for depth testing is DF_LEQUAL; then, the depth buffer zone will be written with 0.5 first, and the color buffer zone will be written with red, subsequently when the yellow color is rendered, a result of 0.2<0.5 is obtained through the comparison function, so the value of the depth buffer zone is updated to 0.2 and the color buffer zone is updated to yellow after the test is performed that is to say, since the depth of yellow is shallow, a red color with larger depth should be covered.

The eliminating means that in a three-dimensional space, although a polygon has two faces, we may not see those polygons on the back, and some polygons are frontal but are obscured by other polygons. Treating invisible polygons and visible polygons equally will undoubtedly reduce the efficiency of our graphical treatment. At this time, unnecessary surfaces may be eliminated. When the eliminating is performed, the surface required to be eliminated may be set, for example, setting to eliminate the back surface and/or the front surface.

In the present embodiment, the reflectivity of the material for various lights may be further set, wherein the reflectivity may be set for the color component of each light. For example, for the ambient light having color components of red, yellow and blue, the reflectivity may be set for the red as 0.5, for the yellow as 0.1, and for the blue as 0.2. In this way, when ambient light is configured, the surface of the three-dimensional model presents a color and gloss that shows the reflective properties of the material for different lights.

In an embodiment, the creating three-dimensional effect further comprises configuring a light source, the light source comprising one of a point light source, a parallel light source, and a spotlight source. For these three light sources, a position of the light, a direction of the light, a color of the light, and an intensity of the light may all be required to be configured, and after the light is configured, it may be combined according to the light reflectivity of the three-dimensional material when combined with the previously configured material of the three-dimensional model to form different colors on the surface of the three-dimensional model. For the point light source and the spotlight source, the attenuation radius of the light may further configured to simulate the real lighting situation, wherein for the spotlight source, the emission angle and the angle of attenuation of the light may also be configured. Examples will not be listed one by one. It is to be understood that the configuration of the lights may not be limited to the above-mentioned light types, and the light source that may be applied to the technical solutions of the disclosure is incorporated in the disclosure.

In an embodiment, the creating a three-dimensional effect further comprises: configuring a map of the three-dimensional model, specifically comprising: obtaining a texture of the map; configuring a wrapping mode of the texture. In the present embodiment, first, a texture representing the map is required to be obtained by typically using an importing method to import the texture of the map; then, a wrapping mode of the texture may be configured, the wrapping mode refers to how to treat the texture when the three-dimensional model is larger than the texture of the map, wherein the simplest method is REPEAT mode, which repeats the texture of the map until the three-dimensional model is entirely covered by the texture of the map and is a commonly-used mode. Another mode is CLAMP interception mode, which uses the color at the edge of the texture of the map for covering the part of the three-dimensional model that cannot be covered by the texture of the map.

Step S3: generating effect parameters according to the three-dimensional effect.

In the present embodiment, the effect parameters refer to the configured special effect parameters after the three-dimensional effect is created in the step S2, wherein a three-dimensional effect drawing parameter package may be generated according to the effect parameters, so as to be used when generating the three-dimensional effect. The purpose of this step is to provide a drawing parameter package for the three-dimensional effect generation algorithm to load the three-dimensional effect on other face images.

Step S4: obtaining a first face image recognized from an image sensor.

In this step, the face image recognized from a camera is obtained, wherein the face image may be a face recognized from a real person, or may be a picture captured by a camera including a face taken by a camera or a face recognized from a video, which is not limited by the disclosure. In general, the face image is different from the standard face image.

Recognizing the face image is mainly to detect a face in the image. The face detection is a process of arbitrarily giving an image or a sequence of images for searching with certain strategies to determine the location and area of all faces, and a process of determining the presence of a face from a variety of different images or sequences of images and determining the number and spatial distribution of the faces. Usually the method for face detection may be divided into 4 categories: (1) a method based on knowledge, which uses a typical face formation rule library to encode faces, and preforms a face orientation through the relationship between facial features; (2) a method with unchanged features, which aims at finding stable features in the case of changes in attitude, viewing angle or lighting conditions, and then uses these features to determine the face; (3) a template matching method, which stores several standard face patterns to describe the entire face and face features, and then calculates the correlation between the input image and the stored mode for detection; (4) a method based on appearance, opposite to the template matching method, learning from a training image set to obtain models and using these models for detection. Here, an implementation of the method (4) is used to illustrate the process of face detection: first, features are required to be extracted for completing modeling, and in the embodiment, Haar feature, a simple rectangle feature, is used as a key feature to determine the face with fast extraction speed, a feature template for the calculation of the Haar feature in general employing a simple combination of rectangles that is composed of two or more congruent rectangles, wherein there are two rectangles in black and white in the feature template; then, AdaBoost algorithm is used to find some of the key features of a large number of Haar features, and these features are used to generate an effective classifier for detection of the face in the image by the created classifier. In the embodiment, the faces in the image may be one or more.

It is to be understood that since each face detection algorithm has its own advantages, and has a different range of adaptation, a plurality of detection algorithms may be set for automatically switching into different algorithms according to different environments. For example, an algorithm with a poor detection rate but a faster speed may be used in an image with a simple background; an algorithm with a higher detection rate but a slower speed may be used in an image with a complicated background environment; for the same image, a plurality of algorithms may be used to detect the image to improve the detection rate.

Step S5: generating the three-dimensional effect on the first face image according to the effect parameters.

In this step, the same three-dimensional effect on a first face image as on the standard face image is generated on the first face image recognized from the camera according to the effect parameters generated in the step S4, and the position of the three-dimensional effect on the first face image is the same as the position on the standard face image. Specifically, the effect parameters may comprise the parameter set when the three-dimensional effect is created in the step S2, the position of the three-dimensional effect on the first face image is determined through the position of the three-dimensional model in the parameter, the attribute of the three-dimensional effect is determined according to other parameters, and the three-dimensional effect is automatically generated on the first face image through loading these parameters into the three-dimensional effect generation algorithm.

It is to be understood that when a plurality of face images are recognized in the image, the user may select one of the face images that are required for creation of the three-dimensional effect, and may also select the plurality of face images for the same or different treatments. For example, when the three-dimensional effect is created, the standard face may be numbered as e.g. ID1 and ID2, and three-dimensional effects may be set respectively for the standard face images of ID1 and ID2, wherein the three-dimensional effects may be the same or different; when a plurality of face images are recognized from the camera, a three-dimensional effect is added to the plurality of face images according to the recognized order. For example, first recognizing a No. 1 face for adding a three-dimensional effect of ID1 on the standard face image onto the No. 1 face, and then recognizing a No. 2 face for adding a three-dimensional effect of ID2 on the standard face image onto the No. 2 face; if only the three-dimensional effect of ID1 on the standard face image is created, the three-dimensional effect of ID1 on the standard face image may be added onto both face images of No. 1 and No. 2, or the three-dimensional effect may only be added onto the No. 1 face; the plurality of face images may exchange three-dimensional effects through different actions, for example, the No. 2 face adding the three-dimensional effect of ID2 on the standard face image onto the No. 1 face through the action of throwing back head, wherein the specific action is not limited in the disclosure.

Figure 2:
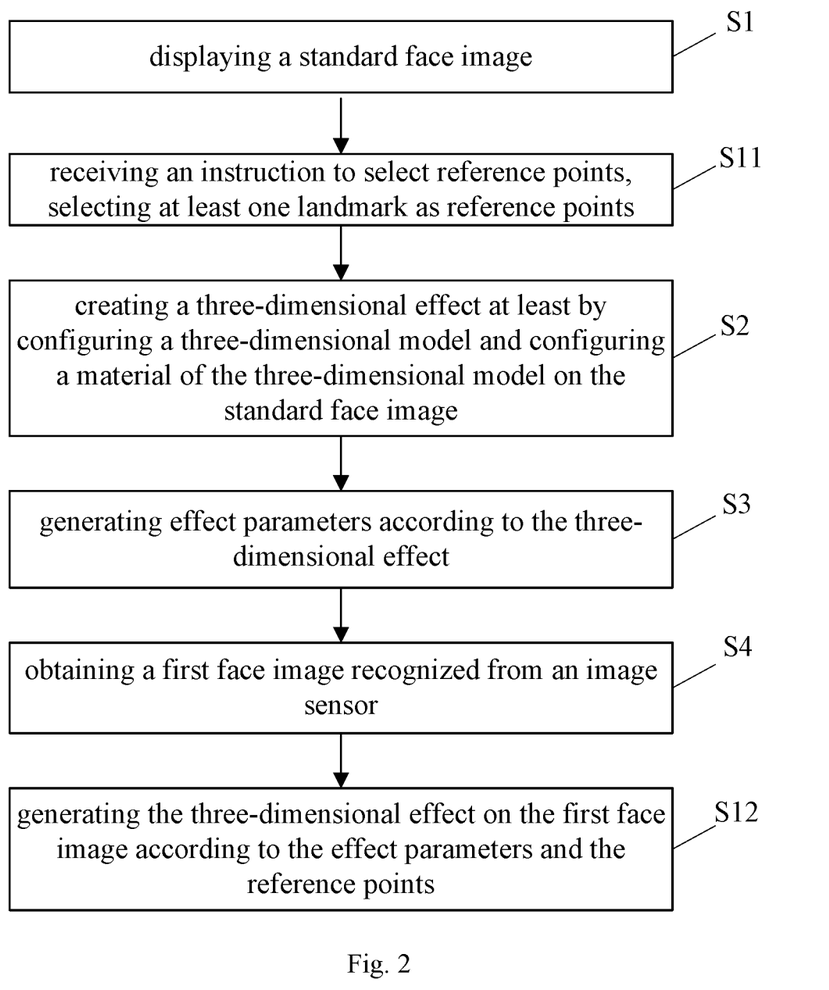
FIG. 2 is a flow chart of a method for generating a three-dimensional effect based on a face according to a still another embodiment of the disclosure.

In the embodiment of the disclosure, creating a three-dimensional effect on the standard face image may configure the three-dimensional effect to generate three-dimensional effect parameters, and then generate a three-dimensional effect on an actual face image according to the three-dimensional effect parameters. In the conventional art, the three-dimensional effect may be made by a third party tool, so that the flexibility is insufficient to be unable to configure the effect in real time, and the effect may only be placed in the existed image or video while being unable to generate the three-dimensional effect on the face image captured in real time. In the embodiment, through the three-dimensional effect creating operation, the three-dimensional effect may be easily configured and edited by a user, and by generating three-dimensional effect parameters, the three-dimensional effect generation algorithm may generate three-dimensional effects on the face images acquired in real time using three-dimensional effects parameters. Therefore, compared with the prior art, the difficulty in editing and the time for editing of the three-dimensional effect are greatly reduced, and the three-dimensional effects may be synchronized with any face images captured in real time, thereby improving the user experience In an optional embodiment, the standard face image comprises a face landmark, as shown in FIG. 2, and for the step S1, after the displaying the standard face image, the method comprises:

Step S11: receiving an instruction to select reference points, selecting at least one landmark as reference points.

For the step S5, the generating the three-dimensional effect on the first face image according to the effect parameters specifically comprises the step S12:

generating the three-dimensional effect on the first face image according to the effect parameters and the reference points.

Since the three-dimensional effect on the standard face image requires a mapping relationship with respect to the three-dimensional effect of the first face image captured by the image sensor, the tracking method may be divided into a fixed three-dimensional effect and a tracking three-dimensional effect according to the mapping method. In an embodiment, the fixed three-dimensional effect is used as long as setting an absolute position of the range of the entire three-dimensional effects in the image sensor, and this method may be implemented by corresponding the display device to the pixel points of the image acquisition window of and the image sensor one by one, by determining the position of the three-dimensional effect in the display device, and then by performing a corresponding three-dimensional effect treatment on the corresponding position of the image acquired by the image sensor acquisition window. This three-dimensional effect treating method has advantages of simplicity and easy operation, and the parameters used in this implementation are relative to the position of the acquisition window. In another embodiment, when the three-dimensional effect is created, a landmark of the standard face image in the step S1 is obtained first, and a position of the three-dimensional effect in the standard face image is determined according to the landmark; a first face image corresponding to the standard face image is recognized from the image captured by the image sensor; the position determined in the standard face image is mapped into the first face image; and a three-dimensional effect treatment is performed on the first face image to generate a three-dimensional effect image. In this way, a relative position of the three-dimensional effect is determined in the first face image, so that regardless of how the first face image moves and changes, the three-dimensional effect is always located at the relative position, thereby achieving the purpose of tracking the three-dimensional effect. In a typical application, the standard face image is subjected to triangulation to have 106 landmarks, the relative position of the three-dimensional effect with respect to the landmarks is used to determine a relative position with an acting range in the face image, and similarly the face image captured by the camera is subjected to triangulation; then, when the face in the camera moves or rotates, the three-dimensional effect may be always fixed on the relative position on the face, so as to achieve the effect of tracking the three-dimensional effect.

The reference point functions to determine the relative position, and the reference point on the standard face image has a landmark corresponding thereto on the first face image; then a mapping relationship is generated through the reference point and the landmark on the first face image, and the three-dimensional effect may be generated on a corresponding position on the first face image through the mapping relationship.

In this optional embodiment, only by meeting some certain conditions may the three-dimensional effect trigger to display, and the trigger condition may be an action, an expression, a sound of the user or parameters of the terminal, etc. The action may be a facial action such as blinking, mouth opening, shaking his head, nodding, eyebrows flickering, for example, when the three-dimensional effect is a three-dimensional sticker of a pair of glasses, the trigger condition may be set as twice quick blinking, and when the twice quick blinking of the user is detected, the three-dimensional sticker of a pair of glasses is displayed on the eyes of the user; the expression may happy, frustrated, angry expressions, etc., for example, when the three-dimensional effect is a three-dimensional sticker of a tear, the trigger condition may be set as a frustrated expression, and when the expression of the user is detected as a frustrated expression, the three-dimensional sticker of a tear is displayed below the eyes of the user; when the trigger condition is a sound, a voice of the user or an ambient sound may be detected, and when a predetermined sound is detected, a corresponding three-dimensional effect is triggered; when the trigger condition is the parameter of a terminal, the parameters of various components of the terminal, such as posture, shaking etc. of the terminal, may be monitored for triggering a corresponding three-dimensional effect through the posture or shaking, which will not be listed one by one. It is to be understood that the trigger condition may be any trigger conditions suitable for the technical solution of the disclosure. The trigger condition may be one or more, and no limitation is imposed herein. The triggering may be a start of the trigger or a disappearance of the trigger, wherein when the start of the trigger appears as the trigger condition, a corresponding three-dimensional effect appears, and the disappearance of the trigger appears as the trigger condition, a corresponding three-dimensional effect disappears; the trigger condition may comprise a delay time after triggering, that is, a time for delaying until the three-dimensional effect appears or disappears after the trigger condition appears.

In above description, although the steps in the above method embodiments are described in the order described above, those skilled in that art may appreciate that The steps in the embodiments of the steps in the embodiments of the disclosure are not necessarily performed in the above order, and may also be performed in other orders, such as reverse order, parallel, cross, and the like, and on the basis of above steps, those skilled in the art may also add other steps. The manner in which these obvious variations or equivalent substitutions are also included in the scope of the disclosure, which is not described herein.

The followings are embodiments of the apparatus of the disclosure, which may execute the steps implemented by the method embodiments of the disclosure. For ease of explanation, only parts related to the embodiments of the disclosure are shown. For the specific technical details that are not disclosed, please refer to the method embodiments of the disclosure.

Figure 3:
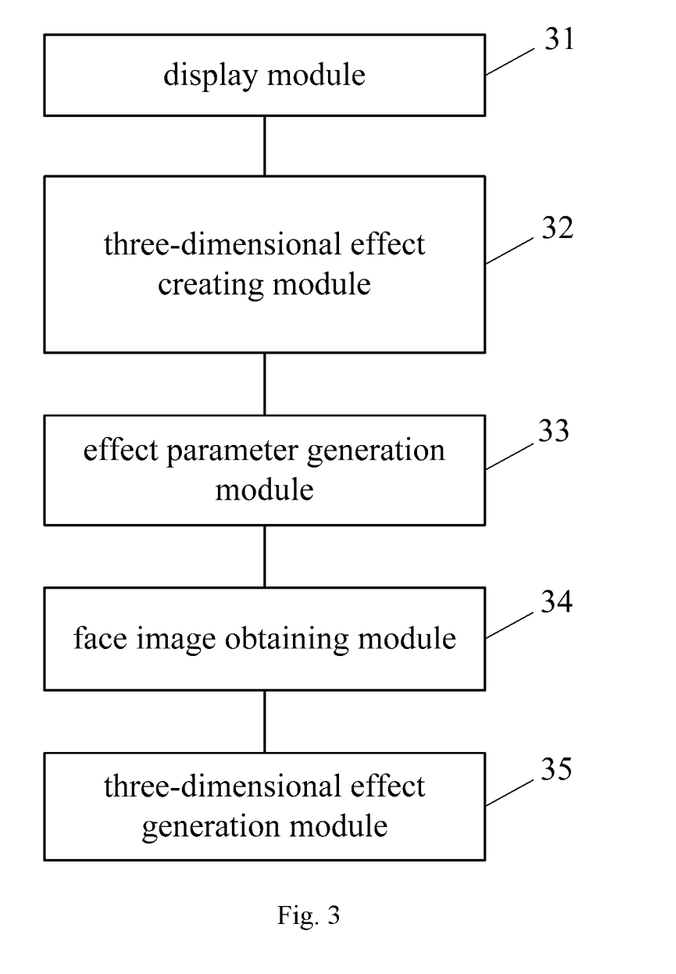
FIG. 3 is a structural view of an apparatus for generating a three-dimensional effect based on a face according to an embodiment of the disclosure.

Provided is an apparatus for generating a three-dimensional effect based on a face in the embodiment of the disclosure. The apparatus may execute the steps according to the embodiments of above method for generating a three-dimensional effect based on a face. As shown in FIG. 3, the device mainly comprises a display module 31, a three-dimensional effect creating module 32, an effect parameter generation module 33, a face image obtaining module 34 and a three-dimensional effect generation module 35. Among them, the display module 31 is used for displaying a standard face image; the three-dimensional effect creating module 32 is used for creating a three-dimensional effect at least by configuring a three-dimensional model and configuring a material of the three-dimensional model on the standard face image; an effect parameter generation module 33 is used for generating effect parameters according to the three-dimensional effect; a face image obtaining module 34 is used for obtaining a first face image recognized from an image sensor; a three-dimensional effect generation module 35 for generating the three-dimensional effect on the first face image according to the effect parameters.

The above apparatus for generating a three-dimensional effect based on a face is consistent with the method for generating a three-dimensional effect based on a face in the embodiment shown in FIG. 1. For details, refer to the foregoing description of the method for generating a three-dimensional effect based on a face, and details are not described herein again.

Figure 4:
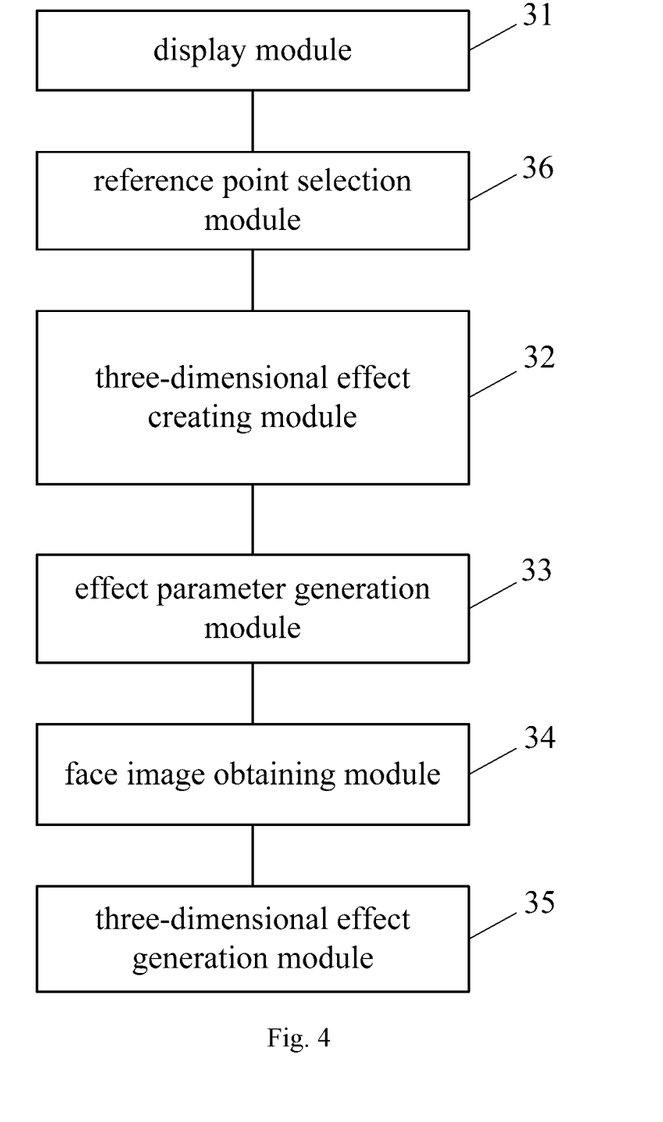
FIG. 4 is a structural view of an apparatus for generating a three-dimensional effect based on a face according to a still another embodiment of the disclosure.

As shown in FIG. 4, in an optional embodiment, the apparatus for generating a three-dimensional effect based on a face further comprises:

a reference point selection module 36 for receiving an instruction to select reference points, selecting at least one landmark as reference points.

The three-dimensional effect generation module 35 is used for generating the three-dimensional effect on the first face image according to the effect parameters and the reference points.

The above apparatus for generating a three-dimensional effect based on a face is consistent with the method for generating a three-dimensional effect based on a face in the embodiment shown in FIG. 2. For details, refer to the foregoing description of the method for generating a three-dimensional effect based on a face, and details are not described herein again.

In the embodiment of the disclosure, creating a three-dimensional effect on the standard face image may configure the three-dimensional effect to generate three-dimensional effect parameters, and then generate a three-dimensional effect on an actual face image according to the three-dimensional effect parameters. In the conventional art, the three-dimensional effect may be made by a third party tool, so that the flexibility is insufficient to be unable to configure the effect in real time, and the effect may only be placed in the existed image or video while being unable to generate the three-dimensional effect on the face image captured in real time. In the embodiment, through the three-dimensional effect creating operation, the three-dimensional effect may be easily configured and edited by a user, and by generating three-dimensional effect parameters, the three-dimensional effect generation algorithm may generate three-dimensional effects on the face images acquired in real time using three-dimensional effects parameters. Therefore, compared with the prior art, the difficulty in editing and the time for editing of the three-dimensional effect are greatly reduced, and the three-dimensional effects may be synchronized with any face images captured in real time, thereby improving the user experience.

Figure 5:
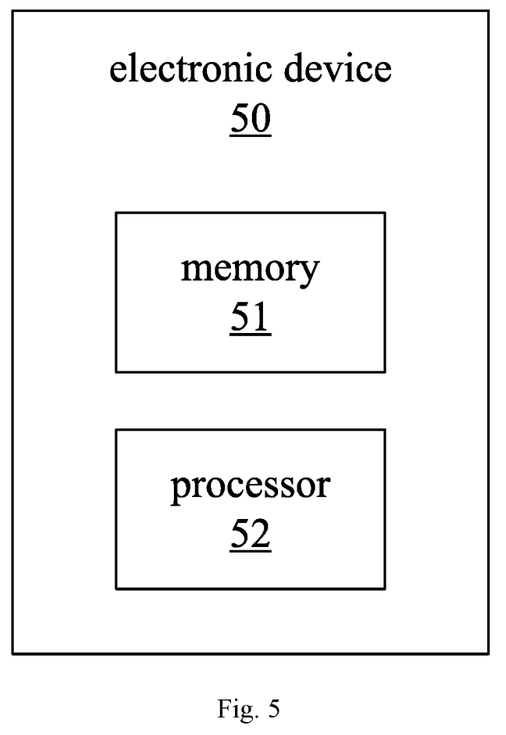
FIG. 5 is a structural view of an electronic device according to an embodiment of the disclosure.

FIG. 5 is a block view of an electronic device according to an embodiment of the disclosure. As shown in FIG. 5, the electronic device 50 according to an embodiment of the disclosure comprises a memory 51 and a processor 52.

The memory 51 is used for storing a non-transitory computer readable instruction. Specifically, the memory 51 may comprises one or more computer program products, which may comprise various forms of computer readable storage mediums, such as a volatile memory and/or a non-volatile memory. The volatile memory may comprise, for example, a random access memory (RAM) and/or a cache or the like. The nonvolatile memory may comprise, for example, a read only memory (ROM), a hard disk, a flash memory, or the like.

The processor 52 may be a CPU or other forms of processing units with data processing capabilities and/or instruction execution capabilities, and may control other components in the electronic device 50 to execute desired functions. In an embodiment of the disclosure, the processor 52 is used to execute the computer readable instruction stored in the memory 51 such that the electronic device 50 performs all or part of the steps of the method for generating an effect based on a face of the aforementioned embodiments of the disclosure.

Those skilled in the art may understand that in order to solve the technical problem of how to obtain a good user experience effect, a well-known structure such as a communication bus, an interface, or the like may also be included in the embodiment, and these well-known structures are also intended to be included within the scope of the disclosure.

For a detailed description of the present embodiment, reference may be made to the corresponding description in the foregoing embodiments, and details are not described herein again.

Figure 6:
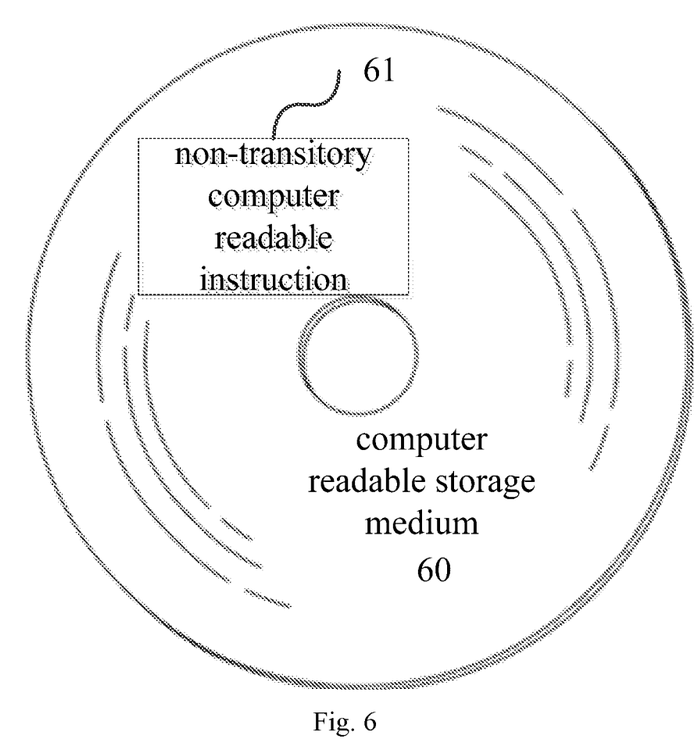
FIG. 6 is a structural view of a computer readable storage medium according to an embodiment of the disclosure.

FIG. 6 is a view of a computer readable storage medium according to an embodiment of the disclosure. As shown in FIG. 6, the computer readable storage medium 60 according to an embodiment of the disclosure stores a non-transitory computer readable instruction 61 thereon. When the non-transitory computer readable instruction 61 is run by the processor, all or part of the steps of the method for generating an effect based on a face of the aforementioned embodiments of the disclosure are performed.

The above computer readable storage medium 60 comprises, but is not limited to an optical storage media (e.g., CD-ROM and DVD), a magneto-optical storage media (e.g., MO), a magnetic storage medium (e.g., a magnetic tape or a removable hard disk), a medium having a built-in rewritable nonvolatile memory (e.g., a memory card), and a medium having a built-in ROM (e.g., a ROM cartridge).

For a detailed description of the present embodiment, reference may be made to the corresponding description in the foregoing embodiments, and details are not described herein again.

Figure 7:
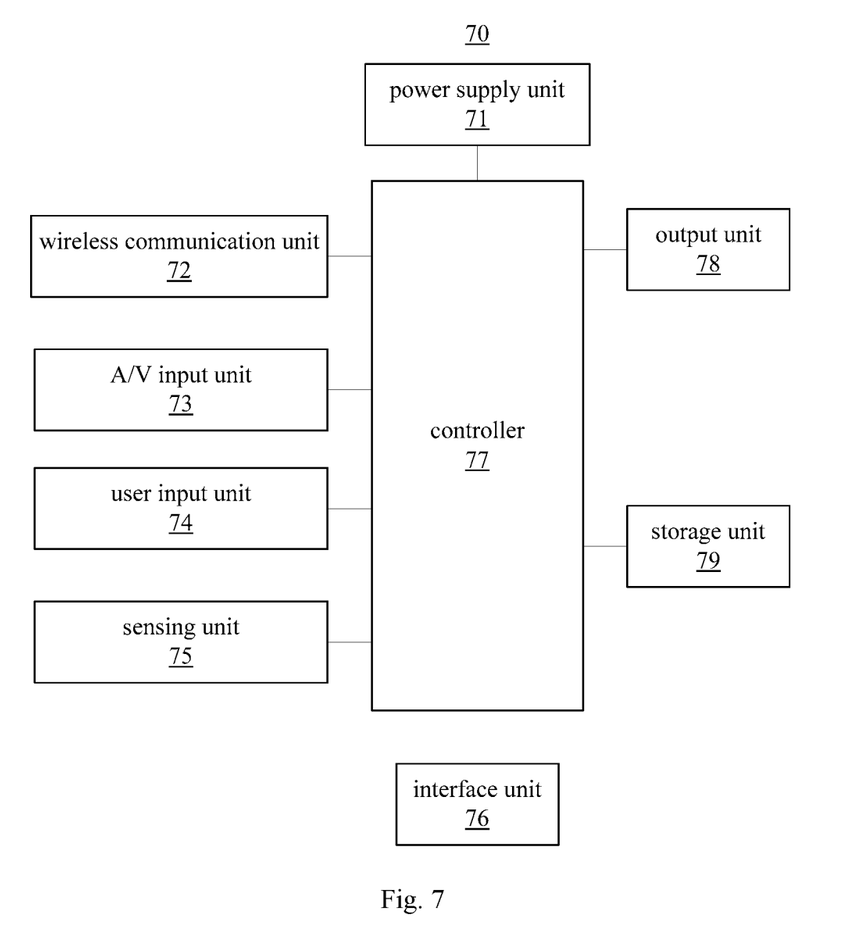
FIG. 7 is a structural view of a terminal for generating a three-dimensional effect based on a face according to an embodiment of the disclosure.

FIG. 7 is a structural view of hardware of a terminal device according to an embodiment of the disclosure. As shown in FIG. 7, the terminal 70 for generating a three-dimensional effect based on a face comprises the above device embodiments for generating a three-dimensional effect based on a face.

The terminal device may be implemented in various forms, and the terminal device in the disclosure may comprise but is not limited to the mobile terminal device such as a mobile phones, a smart phone, a laptop, a digital broadcast receivers, PDA (personal digital assistants), a PAD (tablet), a PMP (portable multimedia player), a navigation device, a vehicle terminal device, vehicle display terminal, and onboard electronic rearview mirror, etc., and the fixed terminal device such as a digital TV, a desktop computer, or the like.

As an implementation for equivalent substitution, the terminal may further comprise other components. As shown in FIG. 7, the terminal 70 for generating a three-dimensional effect based on a face may comprise a power supply unit 71, wireless communication unit 72, an A/V (audio/video) input unit 73, a user input unit 74, a sensing unit 75, an interface unit 76, a controller 77, an output unit 78, a storage unit 79, and the like. FIG. 7 illustrates a terminal having various components, but it should be understood that not all illustrated components may be implemented, and more or fewer components may be implemented instead.

Among which, the wireless communication unit 72 allows for radio communication between terminal 70 and a wireless communication system or network. The A/V input unit 73 is used for receiving an audio or video signal. The user input unit 74 may generate key input data in accordance with a command input by the user to control various operations of the terminal device. The sensing unit 75 detects a current state of the terminal 70, a position of the terminal 70, the presence or absence of a user's touch input to the terminal 70, an orientation of the terminal 70, and an acceleration or a deceleration movement and directions of terminal 70, etc., and generate a command or a signal for controlling the operation of the terminal 70. The interface unit 76 serves as an interface through which at least one external device may be connected to the terminal 70. The output unit 78 is configured to provide an output signal in a visual, audio, and/or tactile manner. The storage unit 79 may store a software program or the like that performs processing and control operations performed by the controller 77, or may temporarily store data that has been output or is to be output. The storage unit 79 may comprise at least one type of storage medium. Moreover, the terminal 70 may cooperate with a network storage apparatus that performs a storage function of the storage unit 79 through a network connection. The controller 77 typically controls the overall operation of the terminal device. Additionally, the controller 77 may comprise a multimedia module for reproducing or playing back multimedia data. The controller 77 may perform a recognition processing in a manner of execution mode to recognize the handwriting input or the picture drawing input performed on the touch screen as a character or an image. The power supply unit 71 receives external power or internal power under the control of the controller 77 and provides appropriate power required to operate the various members and components.

Various implementations for the method for generating a three-dimensional effect based on a face provided by the disclosure may be implemented in a computer readable medium using, for example, computer software, hardware, or any combination thereof. For implementation by hardware, various implementations for the method for generating a three-dimensional effect based on a face provided by the disclosure may be implemented by using at least one of an application specific integrated circuit (ASIC), a digital signal processor (DSP), a digital signal processing device (DSPD), programmable logic device (PLD), field programmable gate array (FPGA), a processor, a controller, a microcontroller, a microprocessor, and an electronic unit designed to perform the functions described herein. In some cases, various implementations for the method for generating a three-dimensional effect based on a face provided by the disclosure may be implemented in the controller 77. For implementation by software, various implementations for the method for generating a three-dimensional effect based on a face provided by the disclosure may be implemented with separate software modules that allow execution of at least one function or operation. The software code may be implemented by a software application (or program) written in any suitable programming language, which may be stored in storage unit 79 and executed by controller 77.

For a detailed description of the present embodiment, reference may be made to the corresponding description in the foregoing embodiments, and details are not described herein again.

The basic principles of the disclosure have been described above in connection with specific embodiments. However, it should be noted that the strong points, advantages, effects, and the like mentioned in the present disclosure are merely examples and are not to be construed as limiting the benefits, advantages, effects, and the like, which are necessary for the various embodiments of the disclosure. In addition, the specific details of the above disclosure are only for the purpose of illustration and ease of understanding, and the above details are not intended to limit the invention to the specific details described above.

The block diagrams of the devices, apparatuses, equipment, systems of the disclosure are merely illustrative and are not intended to be required or implied, and must be connected, arranged, and configured in the manner shown in the block diagram. As will be appreciated by those skilled in the art, these devices, apparatuses, equipment, systems may be connected, arranged, and configured in any manner Words such as "including", "comprising", "having", and the like, are meant to mean "including but not limited to" and may be used interchangeably. The terms "or" and "and" are used herein to mean the word "and/or" and are used interchangeably unless the context clearly indicates otherwise. The term "such as" as used herein refers to a phrase "such as but not limited to" and these two terms may be used interchangeably.

In addition, as used herein, an "or" used in the enumeration of items beginning with "at least one" indicates a separate list, so that, for example, the listing of "at least one of A, B, or C" means A or B or C, or AB or AC or BC, or ABC (i.e., A and B and C). Moreover, the wording "exemplary" does not mean that the described examples are preferred or better than the other examples.

It should also be noted that in the systems and methods of the disclosure, various components or steps may be decomposed and/or recombined. These decompositions and/or recombination should be considered as equivalents to the disclosure.

Various changes, substitutions and alterations of the techniques described herein may be made without departing from the teachings of the invention as defined in the appended claims. Further, the scope of the claims of the disclosure is not limited to the specific aspects of the processing, machine, manufacturing, event composition, means, method or action described above. The processing, machine, manufacturing, event composition, means, method or action that currently exists or is to be developed later performing substantially the same function or achieving substantially the same results as the corresponding aspects described herein may be used. Accordingly, the appended claims comprise such processing, machine, manufacturing, event composition, means, method or action within its scope.

The above description of the disclosed aspects is provided to enable those skilled in the art to make or use the disclosure. Various modifications to these aspects are obvious to those skilled in the art, and the general principles defined herein may be applied to other aspects without departing from the scope of the disclosure. Therefore, the disclosure is not intended to be limited to the aspects shown herein, but in the broadest scope of the principles and novel features disclosed herein.

The foregoing description has been presented for purposes of illustration and description. Further, the description is not intended to limit the embodiments of the disclosure to the forms disclosed herein. Although a number of example aspects and embodiments have been discussed above, those skilled in the art will recognize certain variations, modifications, changes, additions and sub-combinations thereof.

The invention claimed is:

1. A method for generating a three-dimensional effect based on a face, comprising steps of:
    displaying a standard face image;
    creating a three-dimensional effect at least by configuring a three-dimensional model and configuring a material of the three-dimensional model on the standard face image, wherein the configuring a material of the three-dimensional model further comprises:
        creating the material, and
        adjusting parameters of the material, wherein the parameters of the material comprise a rendering and blending mode parameter, a parameter for whether to perform depth testing, a parameter for whether to perform depth writing, and a parameter for whether to perform eliminating one or more of parameters;
    generating effect parameters according to the three-dimensional effect;
    obtaining a first face image recognized from an image sensor;
    generating the three-dimensional effect on the first face image according to the effect parameters.

2. The method of claim 1, wherein the configuring a three-dimensional model comprises:
    obtaining the three-dimensional model, and displaying it on the standard face image;
    configuring a position and a size of the three-dimensional model.

3. The method of claim 1, wherein the creating a three-dimensional effect further comprises:
    configuring a light source, the light source comprising one of a point light source, a parallel light source, and a spotlight source.

4. The method of claim 3, wherein the configuring a light source comprises:
    configuring a position, an orientation, a color, and an intensity of the light source.

5. The method of claim 1, wherein the creating a three-dimensional effect further comprises:
    configuring a map of the three-dimensional model, comprising:

obtaining a texture of the map;
configuring a wrapping mode of the texture.

6. The method of claim 1, wherein:
the standard face image comprises face landmarks, and after the displaying the standard face image, the method comprises:
receiving an instruction to select reference points, selecting at least one landmark as reference points;
the generating the three-dimensional effect on the first face image according to the effect parameters comprises:
generating the three-dimensional effect on the first face image according to the effect parameters and the reference points.

7. An apparatus for generating a three-dimensional effect based on a face, comprising:
at least one processor; and
at least one memory communicatively coupled to the at least one processor and storing instructions that upon execution by the at least one processor cause the apparatus to:
display a standard face image;
create a three-dimensional effect at least by configuring a three-dimensional model and configuring a material of the three-dimensional model on the standard face image;
generate effect parameters according to the three-dimensional effect;
obtain a first face image recognized from an image sensor;
generate the three-dimensional effect on the first face image according to the effect parameters;
wherein at least one memory further stores instructions that upon execution by the at least one processor cause the apparatus to:
create the material; and
adjust parameters of the material, wherein the parameters of the material comprise a rendering and blending mode parameter, a parameter for whether to perform depth testing, a parameter for whether to perform depth writing, and a parameter for whether to perform eliminating one or more of parameters.

8. The apparatus according to claim 7, wherein the processor is configured to execute the computer readable instructions to further perform operations of:
obtaining the three-dimensional model, and displaying it on the standard face image;
configuring a position and a size of the three-dimensional model.

9. The apparatus according to claim 7, wherein the processor is configured to execute the computer readable instructions to further perform operations of:
configuring a light source, the light source comprising one of a point light source, a parallel light source, and a spotlight source.

10. The apparatus according to claim 9, wherein the processor is configured to execute the computer readable instructions to further perform operations of:
configuring a position, an orientation, a color, and an intensity of the light source.

11. The apparatus according to claim 7, wherein the processor is configured to execute the computer readable instructions to further perform operations of:
configuring a map of the three-dimensional model, comprising:
obtaining a texture of the map;
configuring a wrapping mode of the texture.

12. The apparatus according to claim 7, wherein the standard face image comprises face landmarks; and
the processor is configured to execute the computer readable instructions to further perform operations of:
receiving an instruction to select reference points, selecting at least one landmark as reference points;
the generating the three-dimensional effect on the first face image according to the effect parameters comprises:
generating the three-dimensional effect on the first face image according to the effect parameters and the reference points.

13. A non-transitory computer readable storage medium, wherein the non-transitory computer readable storage medium stores computer instructions for enabling a computer to execute operations, the operations comprising:
displaying a standard face image;
creating a three-dimensional effect at least by configuring a three-dimensional model and configuring a material of the three-dimensional model on the standard face image, wherein the configuring a material of the three-dimensional model further comprises:
creating the material, and
adjusting parameters of the material, wherein the parameters of the material comprise a rendering and blending mode parameter, a parameter for whether to perform depth testing, a parameter for whether to perform depth writing, and a parameter for whether to perform eliminating one or more of parameters;
generating effect parameters according to the three-dimensional effect;
obtaining a first face image recognized from an image sensor;
generating the three-dimensional effect on the first face image according to the effect parameters.

14. The non-transitory computer readable storage medium of claim 13, wherein the configuring a three-dimensional model comprises:
obtaining the three-dimensional model;
displaying the three-dimensional model on the standard face image; and
configuring a position and a size of the three-dimensional model.

15. The non-transitory computer readable storage medium of claim 13, wherein the creating a three-dimensional effect further comprises:
configuring a light source, the light source comprising one of a point light source, a parallel light source, and a spotlight source.

16. The non-transitory computer readable storage medium of claim 15, wherein the configuring a light source comprises:
configuring a position, an orientation, a color, and an intensity of the light source.

17. The non-transitory computer readable storage medium of claim 13, wherein the creating a three-dimensional effect further comprises:
configuring a map of the three-dimensional model, wherein the configuring a map of the three-dimensional model comprises:
obtaining a texture of the map; and
configuring a wrapping mode of the texture.

18. The non-transitory computer readable storage medium of claim 13, wherein the standard face image comprises face landmarks, and after the displaying the standard face image, the operations further comprise:

receiving an instruction to select reference points, and selecting at least one landmark as at least one of the reference points; and wherein the generating the three-dimensional effect on the first face image according to the effect parameters further comprises:

generating the three-dimensional effect on the first face image according to the effect parameters and the reference points.

* * * * *